United States Patent [19]

Nomura et al.

[11] Patent Number: 5,796,062
[45] Date of Patent: Aug. 18, 1998

[54] METHOD FOR PRODUCING MOLDING DIE FOR SYNTHETIC RESIN LENS BARREL HAVING A HELICOID AND FOR PRODUCING THE LENS BARREL

[75] Inventors: Hiroshi Nomura; Kazuyoshi Azegami; Takamitsu Sasaki, all of Tokyo, Japan

[73] Assignee: Asahi Kogaku Kogyo Kabushiki Kaisha, Tokyo, Japan

[21] Appl. No.: 781,590

[22] Filed: Jan. 9, 1997

[30] Foreign Application Priority Data

Feb. 21, 1996 [JP] Japan ................................. 8-034124
Sep. 19, 1996 [JP] Japan ................................. 8-247567

[51] Int. Cl.$^6$ ............................. B23H 1/00; G02B 15/14
[52] U.S. Cl. ............................ 219/69.11; 219/68; 359/694
[58] Field of Search .......................... 219/68, 69.11, 219/69.12, 606, 607; 408/54; 359/694, 699, 700

[56] References Cited

U.S. PATENT DOCUMENTS

| | | | |
|---|---|---|---|
| 5,097,586 | 3/1992 | Sawyer | 29/527 |
| 5,144,493 | 9/1992 | Nomura | 359/700 |
| 5,276,318 | 1/1994 | Hirasawa | 250/201.4 |
| 5,347,192 | 9/1994 | Mukohjima et al. | 310/323 |

FOREIGN PATENT DOCUMENTS

| | | |
|---|---|---|
| 7-024652 | 1/1995 | Japan. |
| 1339425 | 12/1973 | United Kingdom. |
| 2262899 | 7/1993 | United Kingdom. |

*Primary Examiner*—Frank G. Font
*Assistant Examiner*—Ricky Mack
*Attorney, Agent, or Firm*—Greenblum & Bernstein P.L.C.

[57] ABSTRACT

A method for producing a male helicoid molding die which is adapted to manufacture an inner barrel having a male helicoid, and for producing a female helicoid molding die which is adapted to manufacture an outer barrel having a female helicoid which can engage with said male helicoid of the inner barrel. The method includes the steps of firstly, setting an included angle of trapezoidal threads of the male helicoid to be identical to an included angle of trapezoidal grooves of the female helicoid in a section perpendicular to a direction of an extension of the threads and preparing a cutting tool having an angle identical to the set angle. Secondly, the male helicoid molding die is machined to form a helicoid portion thereof using the cutting tool. Next, an electric spark machining electrode is prepared having a helicoid portion whose shape is identical to a shape of the helicoid portion of the male helicoid molding die, by a mechanical cutting operation, using the cutting tool. Then a helicoid portion of the female helicoid molding die is formed by electric spark machining using the electric spark machining electrode.

2 Claims, 7 Drawing Sheets

METHOD FOR PRODUCING MOLDING DIE FOR SYNTHETIC RESIN LENS BARREL HAVING A HELICOID AND FOR PRODUCING THE LENS BARREL

BACKGROUND OF THE INVENTION

1. Field of the Invention

The present invention relates to a lens barrel made of synthetic resin having a helicoid (thread) and a method for producing a molding die assembly for the same.

2. Description of the Related Art

A helicoid of a lens barrel is provided with adjacent trapezoidal threads and grooves formed alternately along a circumferential direction of the lens barrel. In the case of a metric thread, the angles of the trapezoidal threads and grooves in a section including an axis of the lens barrel are identical. In a developed view, regardless of whether the threads or grooves of the helicoid are provided externally or internally, they are defined by an identical angle. However, in practice the angle of the trapezoidal grooves is larger than the angle of the trapezoidal threads in a section perpendicular to the direction of an extension of the threads. As the lead angle increases, for example, it exceeds 30 degrees, so does the difference in the angle (angle difference) between the trapezoidal grooves and the threads. The reason for this is that the helicoid formed by the threads and grooves, which are defined by an identical angle in a developed view, is wound onto a cylindrical lens barrel. The angle difference inevitably occurs so long as the threads and grooves are defined by an identical angle.

In a conventional helicoid having a small lead angle, the engagement error (meshing error) due to the angle difference between the trapezoidal threads and grooves is negligible. However, if the lead angle is large, the engagement error is not negligible since the helicoids do not come into surface contact but come into line contact due to the meshing error.

In theory, the shape of the trapezoidal threads or the trapezoidal grooves in a section perpendicular to an extension direction of the threads can be automatically determined when the shape of the trapezoidal grooves or the trapezoidal threads is determined. However, it is difficult to precisely analyze the shape of the trapezoidal threads and grooves. This difficulty increases as the lead angle increases. Consequently, it is extremely difficult to produce molding dies used to form a member having a helicoid.

SUMMARY OF THE INVENTION

It is an object of the present invention to provide a method for producing a molding die assembly for a lens barrel, particularly for a lens barrel having a helicoid with a large lead angle, wherein no strict analysis of the shape of the trapezoidal threads and grooves is needed.

Another object of the present invention is to provide a lens barrel obtained by a molding die assembly thus produced.

The basic concept of the present invention resides in the fact that if the mating male (external) and female (internal) helicoid portions of the male and female molding dies are machined by an identical cutting tool, the male (external) and female (internal) helicoids obtained using the male and female molding dies are deemed to have been formed by the same cutting tool, so that a smooth or certain engagement of the male and female helicoids can be realized without a complex mathematical analysis of the shape of the helicoids. However, it is practically impossible to form the male and female helicoid portions of the male and female molding dies using the same cutting tool. Relatedly, according to the present invention, one of the male and female helicoid portions of the male and female molding dies and an electric spark machining electrode which is adapted to produce the helicoid portion of the other molding die are machined by the same tool.

According to an aspect of the present invention, there is provided a method for producing a male helicoid molding die which is adapted to manufacture an inner barrel having a male helicoid, and for producing a female helicoid molding die which is adapted to manufacture an outer barrel having a female helicoid which can engage with said male helicoid of the inner barrel. The method includes the steps of firstly, setting an angle of trapezoidal threads of the male helicoid to be identical to an angle of trapezoidal grooves of the female helicoid in a section perpendicular to a direction of an extension of the threads and preparing a cutting tool having an angle identical to the set angle. Secondly, the male helicoid molding die is machined to form a helicoid portion thereof using the cutting tool. Next, an electric spark machining electrode is prepared having a helicoid portion with a shape identical to a shape of the helicoid portion of the male helicoid molding die, by a mechanical cutting operation, using the cutting tool. Then a helicoid portion of the female helicoid molding die is formed by electric spark machining using the electric spark machining electrode.

Alternatively, it is possible to set the angle of the trapezoidal threads of the male helicoid to be identical to the angle of the trapezoidal grooves of the female helicoid. In this alternative a method for producing a male helicoid molding die which is adapted to manufacture an inner barrel having a male helicoid, and for producing a female helicoid molding die which is adapted to manufacture an outer barrel having a female helicoid which can engage with the male helicoid of the inner barrel, is provided. The method includes the steps of firstly, setting an angle of trapezoidal grooves of the male helicoid to be identical to an angle of trapezoidal threads of the female helicoid in a section perpendicular to a direction of an extension of the threads and preparing a cutting tool having an angle identical to the set angle. Secondly, the female helicoid molding die is machined to form a helicoid portion thereof, using the cutting tool. Next, an electric spark machining electrode is prepared having a helicoid portion whose shape is identical to a shape of the helicoid portion of the female helicoid molding die, by a mechanical cutting operation using the cutting tool. Then a helicoid portion of the male helicoid molding die is formed by electric spark machining using the electric spark machining electrode.

With the production method of the present invention, a pair of inner and outer barrels in which the angle of the trapezoidal grooves (trapezoidal threads) of the male helicoid is identical to the angle of the trapezoidal threads (trapezoidal grooves) of the female helicoid can be obtained without the need for a detailed analysis of the angles of the threads and grooves.

According to another aspect of the present invention, there is provided a synthetic resin lens barrel having an inner barrel of synthetic resin having a male helicoid and an outer barrel of synthetic resin having a female helicoid which can engage with the male helicoid. An angle of the trapezoidal grooves of the male helicoid and an angle of the trapezoidal threads of the female helicoid are identical in a section perpendicular to a direction of an extension of the threads.

In an alternative, the angle of the trapezoidal threads of the male helicoid and the angle of the trapezoidal grooves of the female helicoid are identical in a section perpendicular to the direction of an extension of the threads.

The present disclosure relates to subject matter contained in Japanese Patent Application Nos. 8-34124 (filed on Feb. 21, 1996), 8-247567 (filed on Sep. 19, 1996) which are expressly incorporated herein by reference in their entireties.

BRIEF DESCRIPTION OF THE DRAWINGS

The invention will be described below in detail with reference to the accompanying drawings, in which similar reference numerals indicate similar elements, and wherein.

DESCRIPTION OF THE PREFERRED EMBODIMENT

Figure 1:
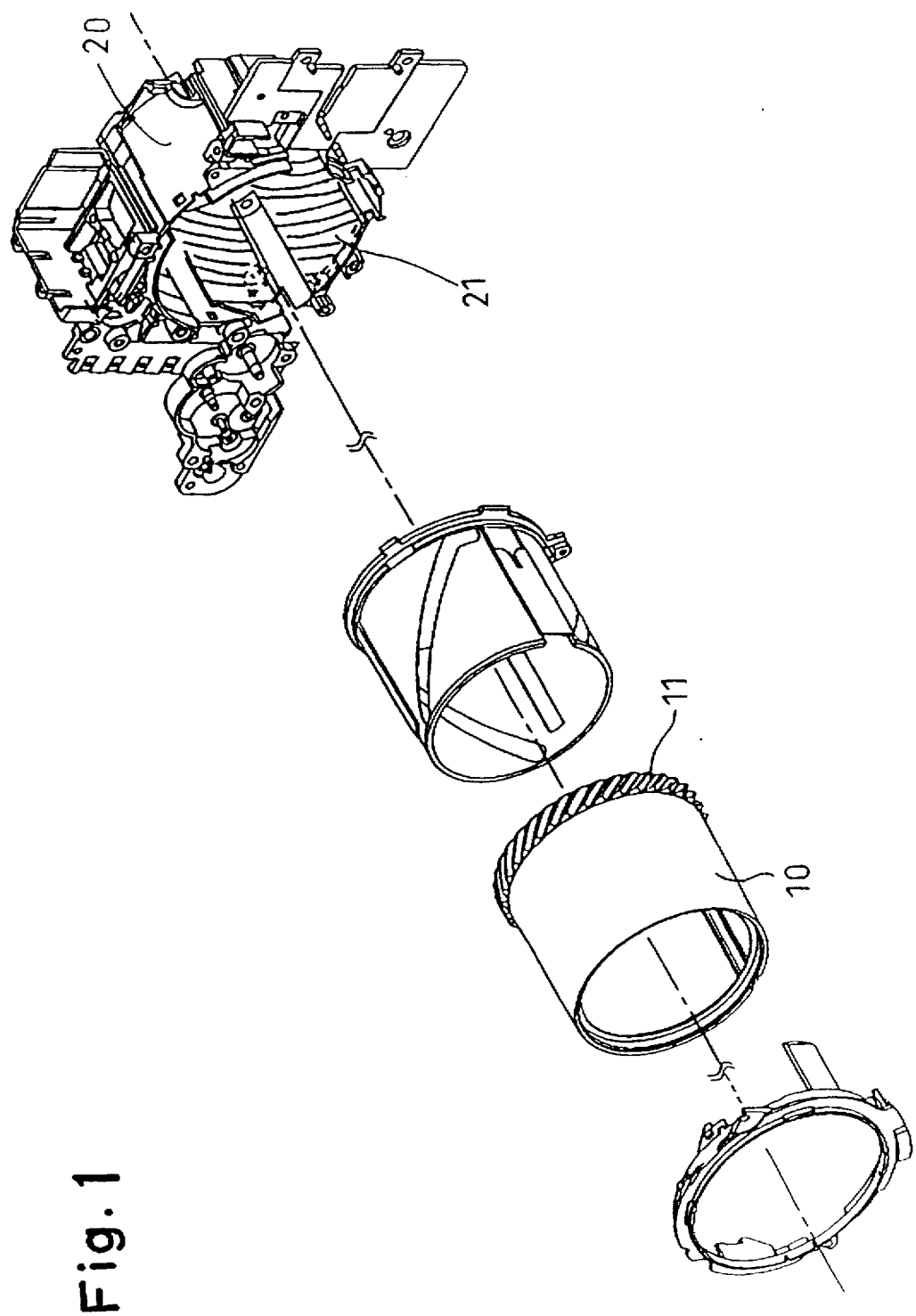
FIG. 1 is a perspective view of synthetic resin lens barrels having helicoids (threads), by way of example, according to the present invention.

FIG. 1 shows an example of an inner barrel 10 and an outer barrel 20 both of which are made of synthetic resin, in which the barrels 10 and 20 are produced using a molding die assembly according to the present invention.

Figure 3:
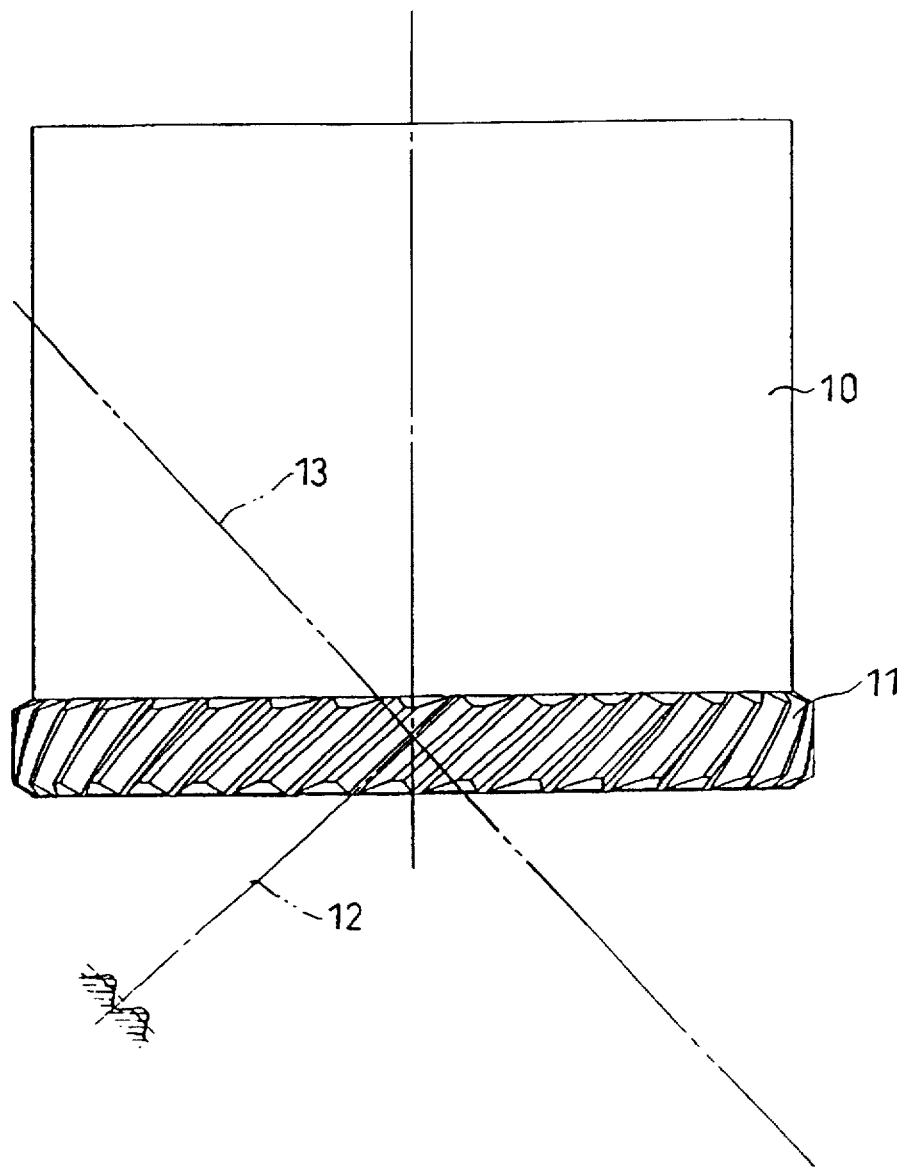
FIG. 3 is a plan view of the lens barrel shown in FIG. 2.
Figure 4:
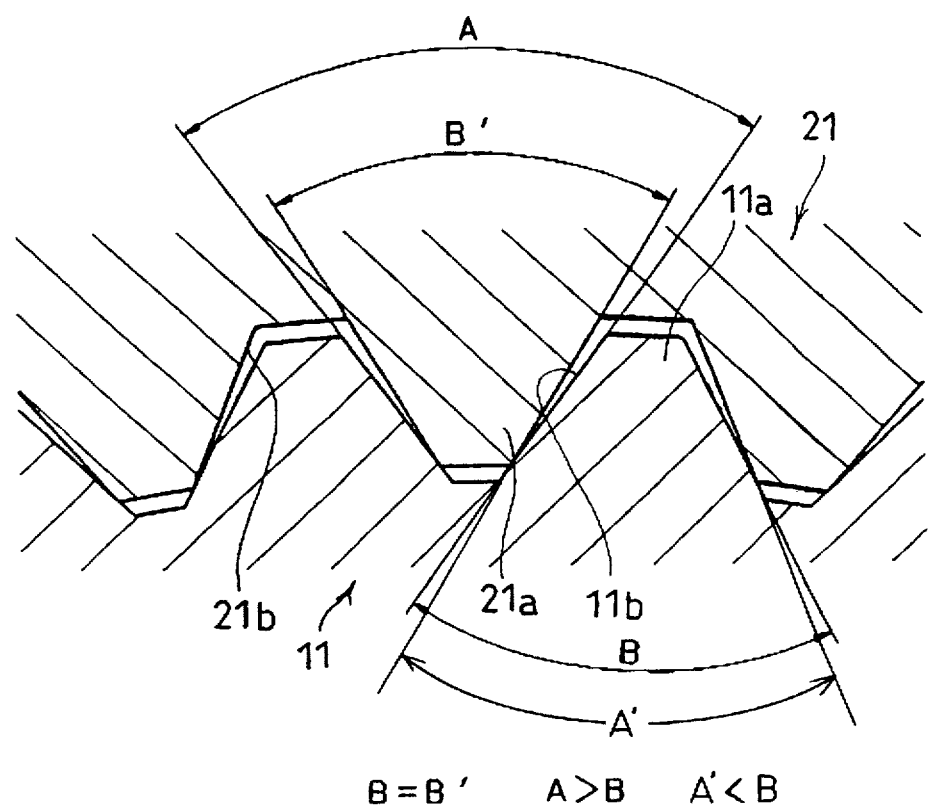
FIG. 4 is a sectional view of a male helicoid in a sectional plane 13 shown in FIG. 3, by way of example.

The inner barrel 10 is provided on an outer peripheral surface thereof with a male helicoid 11. The male helicoid 11 has a large lead angle, for example greater than 30 degrees, and is about 45 degrees in the illustrated embodiment. The outer barrel (stationary barrel) 20 is provided on an inner peripheral surface thereof with a female helicoid 21. The female helicoid 21 engages with the male helicoid 11. The male helicoid 11 and the female helicoid 21 have trapezoidal threads 11a, 21a and trapezoidal grooves 11b, 21b, respectively. The shape of the male helicoid 11 will be discussed below with reference to FIGS. 2 through 4.

Figure 2:
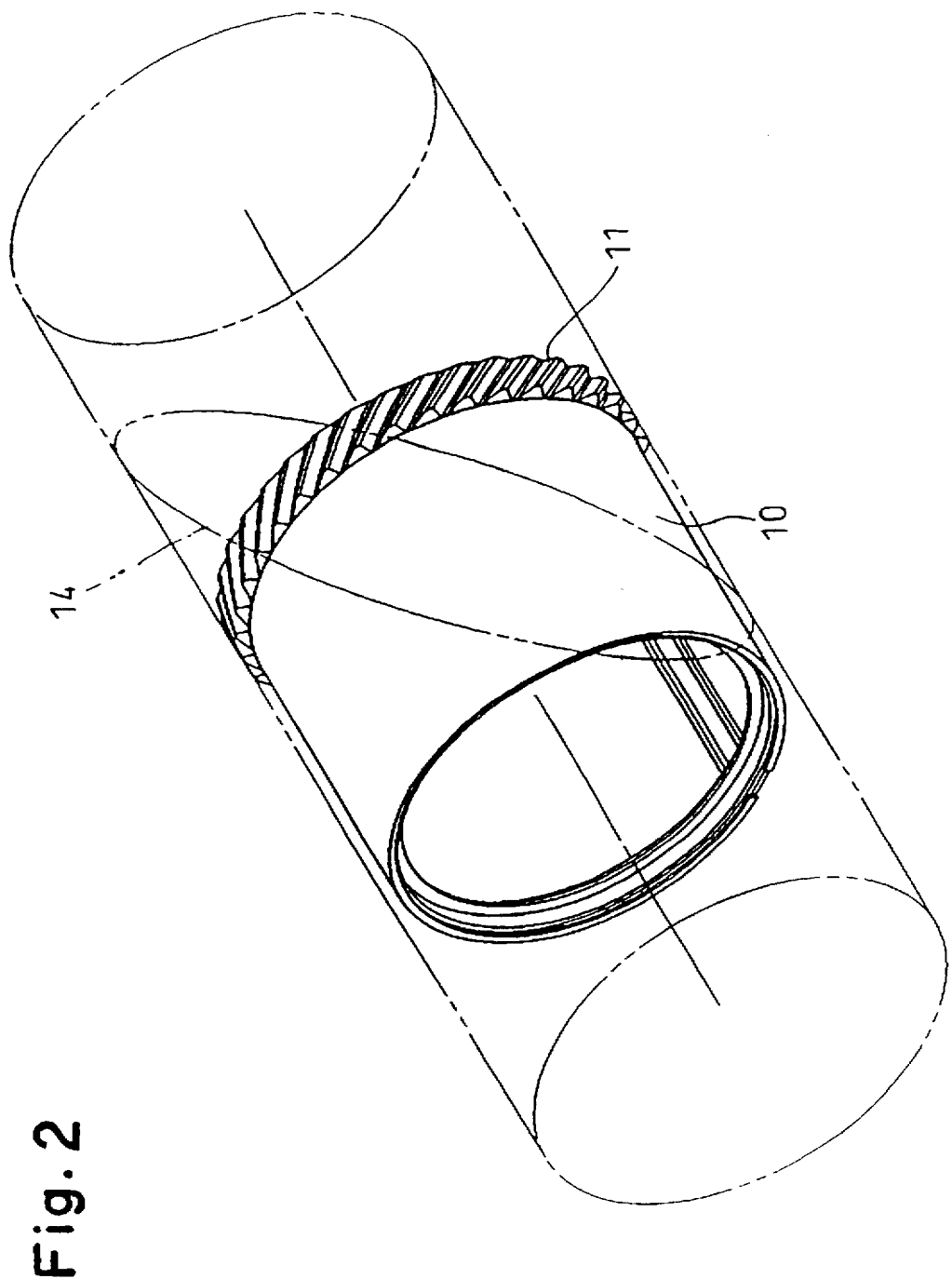
FIG. 2 is an enlarged perspective view of an inner lens barrel having a male helicoid (external thread)

If the inner barrel 10 is sectioned along a plane 13 perpendicular to the direction of an extension of the threads of the male helicoid 11, the section is in the shape of an ellipse 14, as shown in FIG. 2. The included angle "B" between the edges of the trapezoidal threads 11a of the male helicoid 11 is not identical to the included angle "A" between the edges of the trapezoidal grooves 11b thereof in the elliptical section, namely A>B. Consequently, if the included angle B' between the edges of the trapezoidal thread 21a of the female helicoid 21 is designed to be identical to the included angle B of the trapezoidal thread 11a of the male helicoid 11, the helicoids 11 and 21 do not come into surface contact.

According to the present invention, once the shape of the male helicoid 11 and the female helicoid 21 is determined, the angle of the threads 11a and the corresponding grooves of the female helicoid 21 is determined and thereafter, a cutting tool 30 corresponding to the angle is formed. Upon producing a male helicoid molding die (assembly) 31 to manufacture the male helicoid 11 of the inner barrel 10 and a female helicoid molding die (assembly) 36 to manufacture the outer barrel 20, a helicoid portion 32 of a plurality of cores of the male helicoid molding die 31 for the inner barrel 10, and a helicoid groove portion 34 of an electric spark machining electrode 33 which is adapted to carry out electro-spark machining of the molding die 36 for the female helicoid 21 of the outer barrel 20, are cut using the cutting tool 30 mentioned above, as shown in FIGS. 5A and 5B.

Figure 5A:
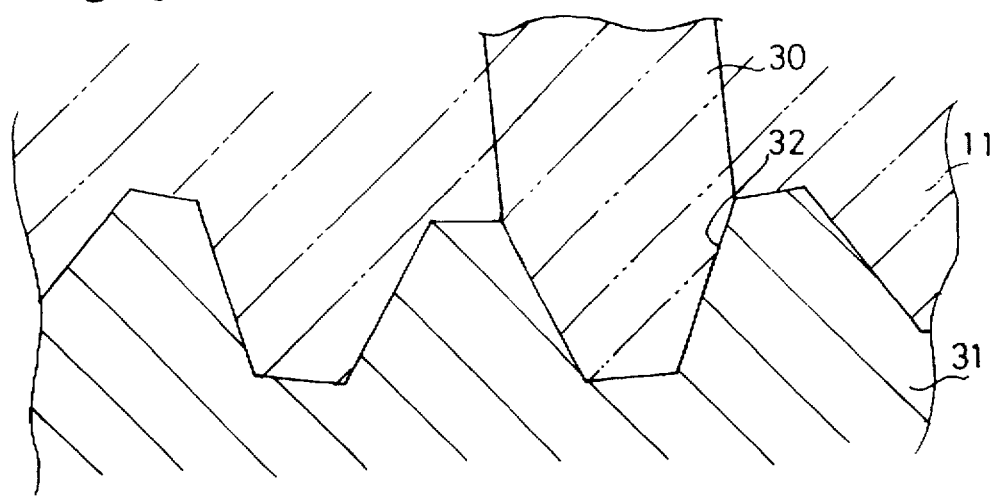
FIGS. 5A and 5B are schematic views of a molding die and an electric spark machining electrode according to the present invention.
Figure 5B:
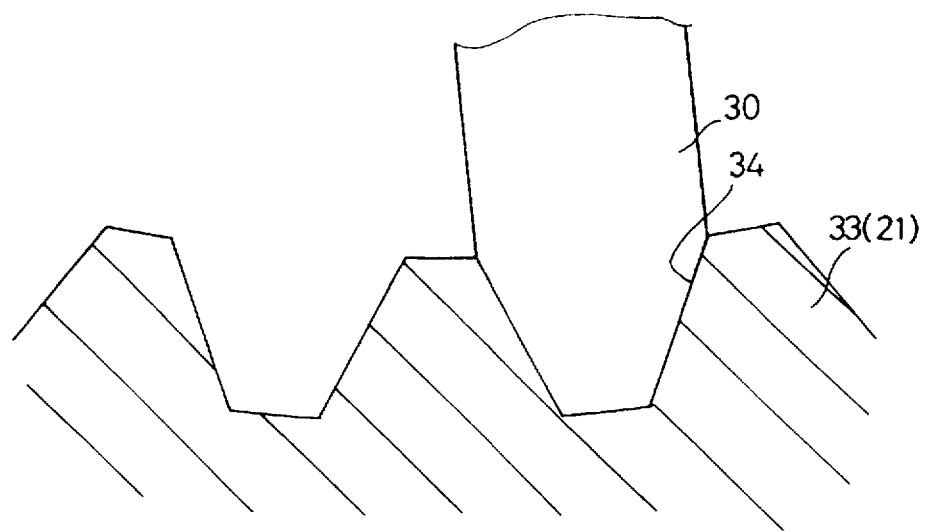
Figure 6:
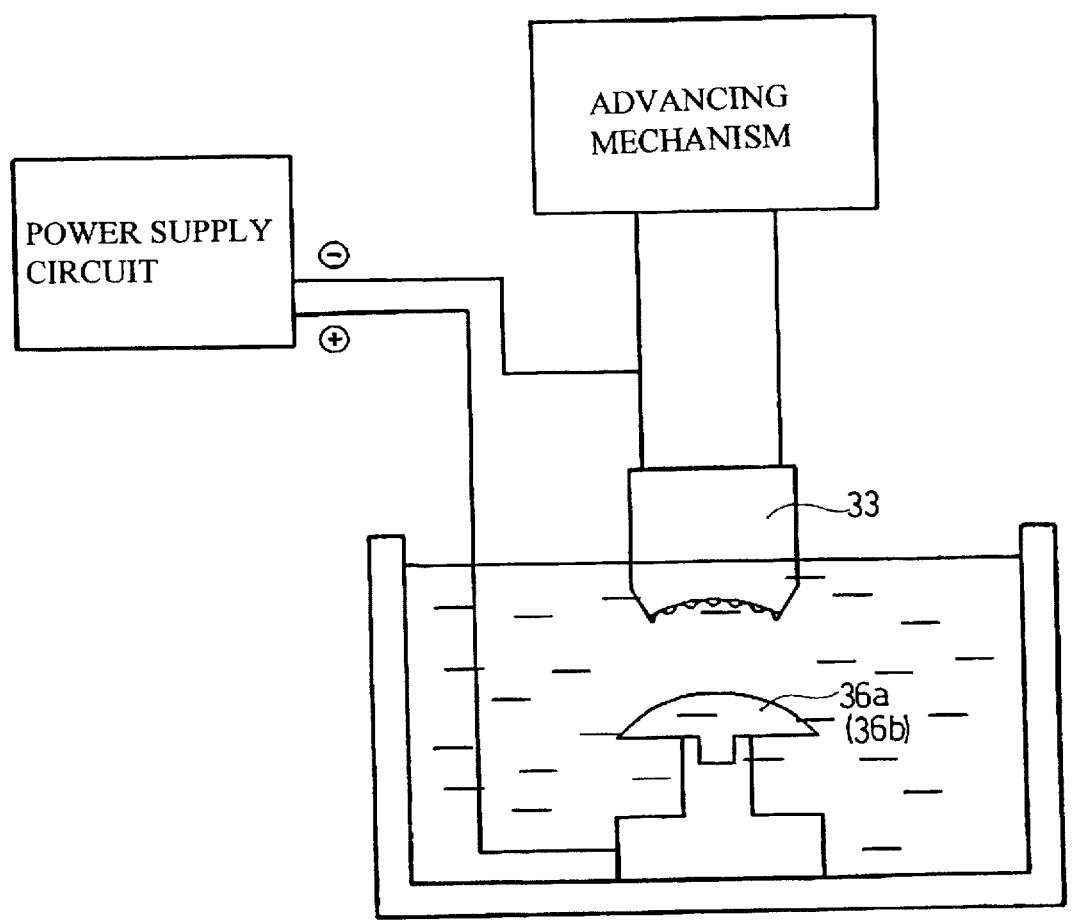
FIG. 6 is a conceptual view of an electric spark machining for making one of cores of a male helicoid molding die assembly, using an electric spark machining electrode shown in FIG. 5B.
Figure 7:
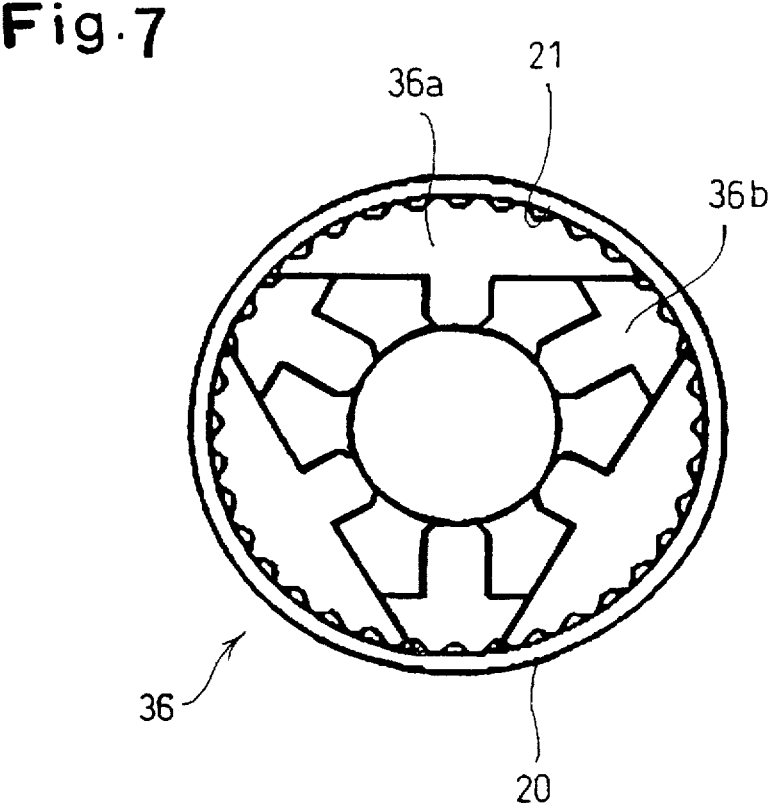
FIG. 7 is a schematic cross-sectional view of a molding die assembly which is comprised of a plurality of the cores made through the electric spark machining shown in FIG. 6.

The electric spark machining electrode 33 on which the helicoid groove portion 34 has been formed is set in an electric discharging machine 40 to machine the cores 36a and 36b of the female helicoid molding die 36, which is adapted to manufacture the outer barrel 20, that corresponds to the female helicoid 21, as shown in FIGS. 6 and 7. The cutting tool 30 is not limited to that shown in FIGS. 5A and 5B, and an end mill can be practically used as the cutting tool 30.

If the inner barrel 10 and the outer barrel 20 are produced using the male helicoid molding die 31 and the female helicoid molding die 36 as constructed above, the angle of the threads 11a of the male helicoid 11 is identical to the included angle between the edges of the trapezoidal grooves of the female helicoid 21 which are engaged with the threads 11a. Consequently, a smooth engagement between the threads and the corresponding grooves can be certainly established. Namely, the shape of the male helicoid 11 of the inner barrel 10 produced using the male helicoid molding die 31 corresponds to the shape of the male helicoid molding die 31, as indicated by dashed hatching in FIG. 5A. The shape of the female helicoid 21 of the inner barrel 20 produced by the female helicoid molding die assembly 36 is identical to the shape of the electric spark machining electrode 33, since the shape of the discharging electrode 33 is transferred to the female helicoid molding die 36 whose shape is reproduced on the female helicoid 21 of the outer barrel 20. Namely, the threads of the male helicoid 11 of the inner barrel 10 and the grooves of the female helicoid 21 of the outer barrel 20 can be deemed to have been cut by the same cutting tool 30. Thus, the threads of the male helicoid 11 and the grooves of the female helicoid 21 have an identical angle. Consequently, the threads of the male helicoid 11 can be smoothly and certainly engaged in the grooves of the female helicoid 21 due to a complementary relationship in the shape therebetween, as can be seen in FIGS. 5A and 5B.

According to a second embodiment of the present invention, once the shape of the male helicoid 11 and the female helicoid 21 is determined, the angle A between the edges of the grooves 11b of the male helicoid 11 and the included angle B' between the edges of the threads of the female helicoid 21 are determined. In the second embodiment, a helicoid portion of the female helicoid molding die for the outer barrel, and a helicoid portion of an electric spark machining electrode which is adapted to carry out an electro-spark machining of the male helicoid molding die for the male helicoid of the inner barrel, are cut using the same cutting tool 30. The helicoid portion of the male helicoid molding die is subject to electro-spark machining in which the electric spark machining electrode is used.

As can be understood from the above discussion, according to the present invention, the molding die for a lens barrel, which is provided with a helicoid, particularly one having a large lead angle, and the lens barrel can be easily produced without the need for a detailed analysis of the shapes of the corresponding trapezoidal threads and grooves.

What is claimed is:

1. A method for producing a male helicoid molding die which is adapted to manufacture an inner barrel having a male helicoid, and for producing a female helicoid molding die which is adapted to manufacture an outer barrel having a female helicoid for engaging with said male helicoid of said inner barrel, the method comprising:

setting an included angle of trapezoidal threads of said male helicoid to be identical to an included angle of trapezoidal grooves of said female helicoid in a section perpendicular to a direction of an extension of said threads and preparing a cutting tool having an angle identical to said set angle;

machining said male helicoid molding die to form a helicoid portion using said cutting tool;

preparing an electric spark machining electrode having a helicoid portion by a mechanical cutting operation using said cutting tool, said helicoid portion of said electric spark machining electrode having a shape identical to a shape of said helicoid portion of said male helicoid molding die; and forming a helicoid portion of said female helicoid molding die by electric spark machining using said electric spark machining electrode.

2. A method for producing a male helicoid molding die which is adapted to manufacture an inner barrel having a male helicoid, and for producing a female helicoid molding die which is adapted to manufacture an outer barrel having a female helicoid for engaging said male helicoid of said inner barrel, comprising:

setting an included angle of trapezoidal grooves of said male helicoid to be identical to an included angle of trapezoidal threads of said female helicoid in a section perpendicular to a direction of an extension of said threads and preparing a cutting tool having an angle identical to said set angle;

machining said female helicoid molding die to form a helicoid portion using said cutting tool;

preparing an electric spark machining electrode having a helicoid portion by a mechanical cutting operation using said cutting tool said helicoid portion of said electric spark machining electrode having a shape identical to a shape of said helicoid portion of said female helicoid molding die; and forming a helicoid portion of said male helicoid molding die by electric spark machining using said electric spark machining electrode.

* * * * *